E. C. NORCROSS.
FOOD CHOPPER.
APPLICATION FILED FEB. 12, 1921.

1,374,092.

Patented Apr. 5, 1921.

Elmer C. Norcross
INVENTOR

UNITED STATES PATENT OFFICE.

ELMER C. NORCROSS, OF PEMBERTON, NEW JERSEY.

FOOD-CHOPPER.

1,374,092. Specification of Letters Patent. Patented Apr. 5, 1921.

Application filed February 12, 1921. Serial No. 444,560.

*To all whom it may concern:*

Be it known that I, ELMER C. NORCROSS, a citizen of the United States, residing at Pemberton, in the county of Burlington and State of New Jersey, have invented new and useful Improvements in Food-Choppers, of which the following is a specification.

This invention relates to improvements in food choppers and has for an object the provision of a device which is simple, strong and durable in construction and by means of which, fruits, vegetables and other foods may be easily and quickly chopped.

With the above and other objects in view, the invention further includes the following novel features and details of construction, to be hereinafter more fully described, illustrated in the accompanying drawings and pointed out in the appended claim.

In the drawings:—

Figure 1:
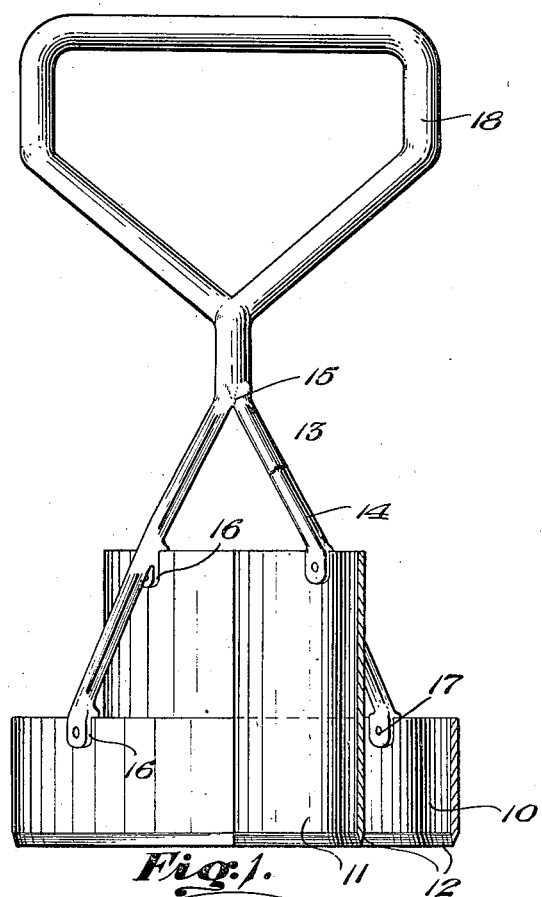
Figure 1 is a sectional elevation of a food chopper embodying the present invention.
Figure 2:
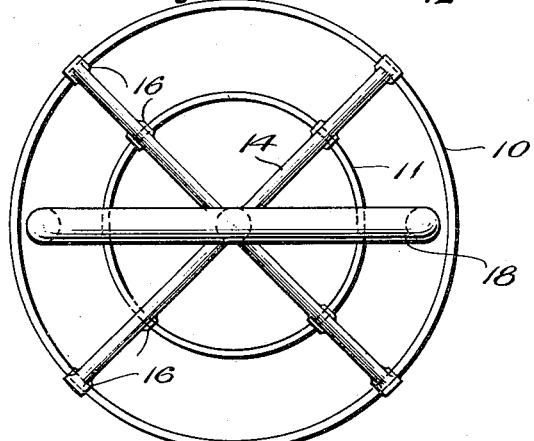
Fig. 2 is a top plan view of the chopper.

Referring in detail to the drawings, wherein like characters of reference denote corresponding parts, the reference characters 10 and 11 indicate outer and inner concentrically arranged cutters, herein shown as of circular formation. These cutters are provided around one edge with cutting edges 12, which cutting edges are arranged in the same transverse plane.

The inner cutter 11 has its opposite end extending beyond the outer cutter end for an appreciable distance and connected to the inner edges of both cutters is a cruciform head 13, the arms 14 of which are relatively inclined, providing a pointed upper end 15. In order to connect the arms 14 with the cutters, the former are provided with spaced pairs of ears 16 which engage the free edges of the cutters and are secured thereto by means of rivets or other fastening devices 17. Connected to the point end of the cruciform head is a handle 18, by means of which the chopper may be operated.

The invention is susceptible of various changes in its form, proportions and minor details of construction and the right is herein reserved to make such changes as properly fall within the scope of the appended claim.

Having described the invention what is claimed is:—

A food chopper comprising concentrically arranged cutters having their cutting edges disposed in the same transverse plane, the opposite end of the inner cutter being extended above the outer cutter, a cruciform head piece having its arms relatively inclined and connected at their pointed end, means for securing the cutters to the arms and a handle connected to the pointed end of said arms.

In testimony whereof I affix my signature.

ELMER C. NORCROSS.